United States Patent
Ku et al.

(10) Patent No.: US 10,701,858 B2
(45) Date of Patent: Jul. 7, 2020

(54) MOBILE VEHICLE, GROUND TREATING EQUIPMENT AND ORIENTATION ADJUSTING METHOD THEREOF

(71) Applicant: Industrial Technology Research Institute, Hsinchu (TW)

(72) Inventors: Yun-Sheng Ku, Taichung (TW);
Yi-Tien Yan, Taichung (TW);
Jiun-Hua Li, New Taipei (TW);
Shu-Hui Yang, Taichung (TW);
Wei-Chieh Chang, Tainan (TW);
Ling-Yu Tsai, Taichung (TW)

(73) Assignee: Industrial Technology Research Institute, Hsinchu (TW)

(*) Notice: Subject to any disclaimer, the term of this patent is extended or adjusted under 35 U.S.C. 154(b) by 445 days.

(21) Appl. No.: 15/841,291

(22) Filed: Dec. 14, 2017

(65) Prior Publication Data
US 2019/0174672 A1     Jun. 13, 2019

(30) Foreign Application Priority Data

Dec. 12, 2017   (TW) .............................. 106143508 A (51) Int. Cl.
*A01D 34/86*     (2006.01)
*A01D 34/00*     (2006.01)
(Continued)

(52) U.S. Cl.
CPC ........... *A01D 34/006* (2013.01); *A01D 34/86* (2013.01); *A01D 75/182* (2013.01); *A01G 20/43* (2018.02); *E01H 1/00* (2013.01); *E01H 1/05* (2013.01)

(58) Field of Classification Search
CPC ...... A01D 34/866; A01D 34/86; A01D 34/43; A01D 34/435; A01D 34/006; A01D 33/14;
(Continued)

(56) References Cited

U.S. PATENT DOCUMENTS 3,922,745 A     12/1975  Lehman
6,672,797 B1 *   1/2004  Zachman .............. E01C 19/004
                                                        404/120
(Continued)

FOREIGN PATENT DOCUMENTS

CN       101324059       12/2008
CN       101780921        7/2010
(Continued)

OTHER PUBLICATIONS

Masakazu Raga, et al., "Digging control system for hydraulic excavator," Mechatronics, vol. 11, Issue 6, Sep. 2001, pp. 665-676.
(Continued)

*Primary Examiner* — Robert E Pezzuto
(74) *Attorney, Agent, or Firm* — JCIPRNET (57) ABSTRACT

A mobile vehicle, a ground treating equipment and an orientation adjusting method thereof are provided. The ground treating equipment includes a frame, a ground treating unit, a connecting rod set, a connecting rod driving unit, a rotation driving unit, two pressure sensors and a controller. The ground treating unit is mounted at the frame. Two ends of the connecting rod set are connected to the frame and the mobile vehicle. The connecting rod driving unit is mounted at the connecting rod set for adjusting the orientation of the connecting rod set. The rotation driving unit is mounted between the frame and the connecting rod set for driving the frame to rotate relative to the connecting rod set. The pressure sensors are mounted at the frame for sensing two
(Continued)

pressure values between the frame and ground, or the pressure sensors are mounted at the rotation driving unit for sensing two pressure values while the frame is driven to rotate clockwise and counter-clockwise. The controller is configured to control the connecting rod driving unit and the rotation driving unit for changing the two pressure values.

16 Claims, 4 Drawing Sheets

(51) Int. Cl.
*A01G 20/43* (2018.01)
*A01D 75/18* (2006.01)
*E01H 1/05* (2006.01)
*E01H 1/00* (2006.01)

(58) Field of Classification Search
CPC .... A01D 75/28; A01D 75/285; A01D 75/182; A01D 41/141; A01D 46/08; A01G 20/43; E01C 19/004; E01H 1/00; E01H 1/05; E02F 9/264; E02F 9/265; E02F 9/2285; E02F 9/2292; E02F 9/2203; E02F 9/2214; E02F 3/32; E02F 3/435; E02F 3/847
USPC ....... 37/348, 468, 403–409; 56/1–3, 7, 10.4, 56/10.2 A–10.2 J, 10.2 R, 14.7–14.9, 15.5, 56/16.4 R; 172/2–11
See application file for complete search history.

(56) References Cited

U.S. PATENT DOCUMENTS

| 7,367,464 | B1 | 5/2008 | Agostini et al. | |
|---|---|---|---|---|
| 7,395,572 | B2 | 7/2008 | Scita | |
| 7,874,152 | B2 | 1/2011 | Pfaff | |
| 8,201,388 | B1* | 6/2012 | Vandeven | A01D 41/141 56/10.2 E |
| 8,943,788 | B2* | 2/2015 | Miller | A01D 33/14 171/139 |
| 9,382,687 | B2* | 7/2016 | Tsukamoto | E02F 9/265 |
| 2006/0242935 | A1* | 11/2006 | Rayfield | A01D 41/141 56/10.2 E |
| 2017/0204886 | A1 | 7/2017 | Wang et al. | |
| 2017/0241097 | A1 | 8/2017 | Sharp et al. | |

FOREIGN PATENT DOCUMENTS

| CN | 102764750 | 11/2012 |
|---|---|---|
| EP | 0722654 | 7/1996 |
| EP | 1967653 | 9/2009 |
| EP | 2721220 | 4/2014 |
| EP | 2871284 | 5/2015 |
| JP | H10337108 | 12/1998 |
| TW | M286135 | 1/2006 |
| TW | M311515 | 5/2007 |
| TW | I309976 | 5/2009 |
| TW | 201238581 | 10/2012 |
| TW | M443852 | 12/2012 |
| TW | 201707891 | 3/2017 |
| TW | M541192 | 5/2017 |

OTHER PUBLICATIONS

Tao Wang, et al., "Improvement of boom control performance for hybrid hydraulic excavator with potential energy recovery," Automation in Construction, vol. 30, Mar. 2013, pp. 161-169.

"Office Action of Taiwan Counterpart Application", dated Oct. 18, 2018, p. 1-p. 12.

* cited by examiner

MOBILE VEHICLE, GROUND TREATING EQUIPMENT AND ORIENTATION ADJUSTING METHOD THEREOF

CROSS-REFERENCE TO RELATED APPLICATION

This application claims the priority benefit of Taiwan application serial no. 106143508, filed on Dec. 12, 2017. The entirety of the above-mentioned patent application is hereby incorporated by reference herein and made a part of this specification.

TECHNICAL FIELD

The disclosure relates to a vehicle, an equipment, and an adjusting method thereof, and particularly relates to a mobile vehicle, a ground treating equipment, and an orientation adjusting method thereof.

BACKGROUND

Conventionally, a vehicle having a suspension arm mounted in the front is used for cleaning the road, and the suspension arm is assembled with tools to perform some functions, such as mowing, sweeping, and cleaning the clearance on the road. However, high structural strength mechanical mechanism is required to mount the commercial and existing suspension arm together with tools having a weight of 2 tons or more, so that it is difficult to mount the suspension arm together with tools on the middle size or smaller vehicle. Otherwise, the existing vehicle having suspension arm needs to be operated manually, the tool is determined whether be placed on the road surface by human eye, and thus the accumulated experience of the operator is relied on, and cause damage because of improper operation.

SUMMARY

The disclosure provides a ground treating equipment configured to connect to a mobile vehicle. The ground treating equipment includes a frame, a ground treating unit, a connecting rod set, a connecting rod driving unit, a rotation driving unit, a first pressure sensor, a second pressure sensor, and a controller. The ground treating unit is mounted at the frame. One end of the connecting rod set connects to the frame, and another end of the connecting rod set connects to the mobile vehicle. The connecting rod driving unit is mounted at the connecting rod set and configured to adjust the orientation of the connecting rod set. The rotation driving unit is mounted between the frame and the connecting rod set and configured to drive the frame to rotate relative to the connecting rod set. The first pressure sensor and the second pressure sensor are mounted at the frame to sense the first pressure value and the second pressure value between the frame and the ground, or mounted at the rotation driving unit to sense the first pressure value and the second pressure value while the frame is driven to rotate clockwise and counter-clockwise. The controller is configured to control the connecting rod driving unit and the rotation driving unit to change the first pressure value and the second pressure value.

The disclosure provides a mobile vehicle having a ground treating equipment. The ground treating equipment includes a frame, a ground treating unit, a connecting rod set, a connecting rod driving unit, a rotation driving unit, a first pressure sensor, a second pressure sensor, and a controller. The ground treating unit is mounted at the frame. One end of the connecting rod set connects to the frame, and another end of the connecting rod set connects to the mobile vehicle. The connecting rod driving unit is mounted at the connecting rod set and configured to adjust the orientation of the connecting rod set. The rotation driving unit is mounted between the frame and the connecting rod set and configured to drive the frame to rotate relative to the connecting rod set. The first pressure sensor and the second pressure sensor are mounted at the frame to sense the first pressure value and the second pressure value between the frame and the ground, or mounted at the rotation driving unit to sense the first pressure value and the second pressure value while the frame is driven to rotate clockwise and counter-clockwise. The controller is configured to control the connecting rod driving unit and the rotation driving unit to change the first pressure value and the second pressure value.

The disclosure provides an orientation adjusting method of a ground treating equipment configured to adjust the orientation of the ground treating equipment as mentioned above. The orientation adjusting method of the ground treating equipment includes: stretching the connecting rod set so that the frame is in contact with ground, and obtaining the first pressure value and the second pressure value; and controlling at least one of the connecting rod driving unit and the rotation driving unit by the controller when the ratio of the first pressure value to the second pressure value is smaller than or greater than the preset value, so as to adjust the ratio of the first pressure value to the second pressure value to be equal to the preset value.

In order to make the aforementioned and other features and advantages of the disclosure more comprehensible, embodiments accompanying figures are described in detail belows.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
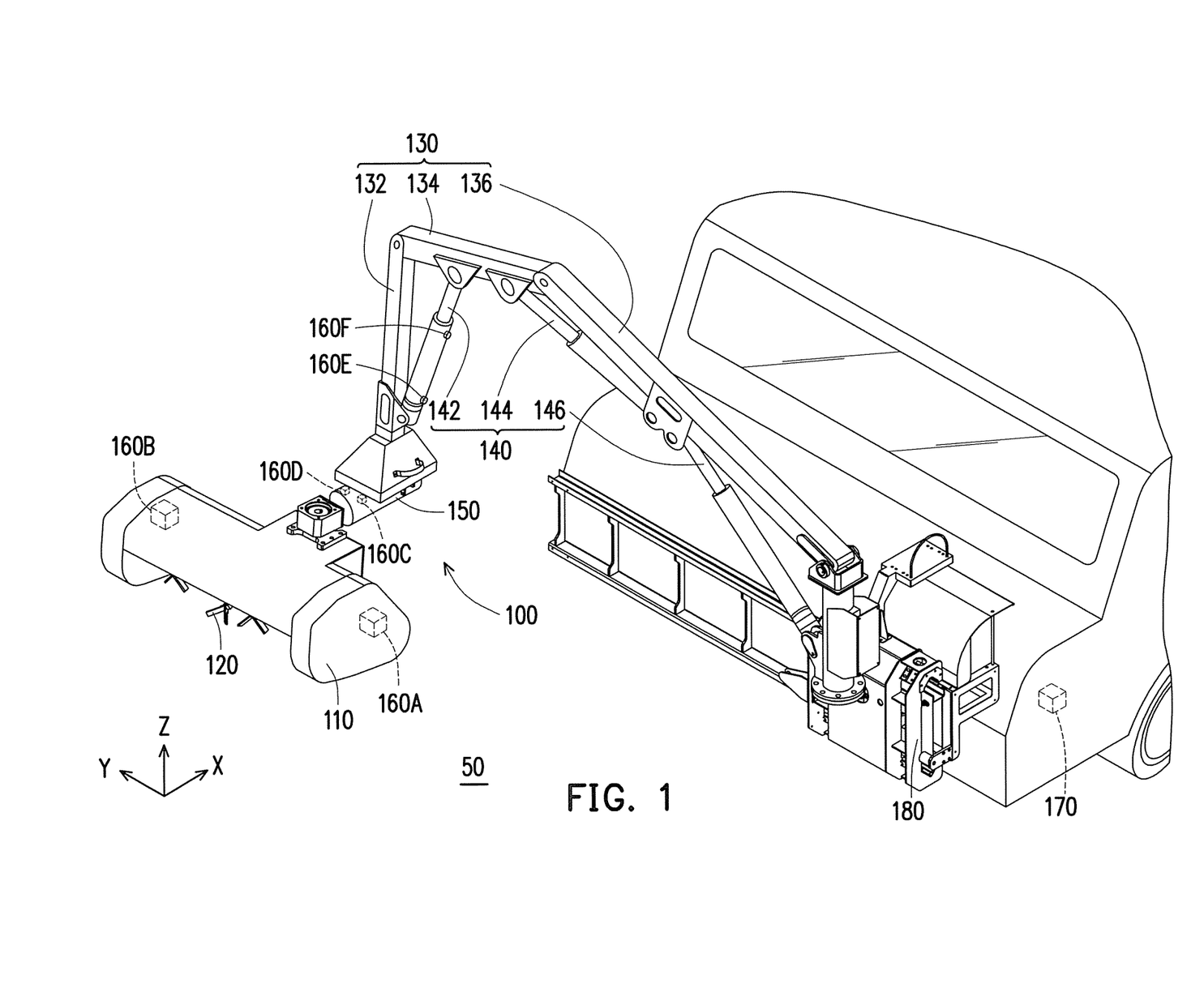
FIG. 1 is a schematic view illustrating a mobile vehicle according to an embodiment of the disclosure.

FIG. 1 is a schematic view illustrating a mobile vehicle according to an embodiment of the disclosure. Referring to FIG. 1, a mobile vehicle 50 of the present embodiment has a ground treating equipment 100. The mobile vehicle 50 of the present embodiment may be a large vehicle, a small vehicle, or other types of mobile vehicles, and is configured to mount the ground treating equipment 100 and moves forward to a target area, so as to perform ground treatment. If necessary, in the process of treating the ground, the mobile vehicle 50 can also carry the ground treating equipment 100 to treat the ground while moving forward.

The ground treating equipment 100 of the present embodiment includes a frame 110, a ground treating unit 120, a connecting rod set 130, a connecting rod driving unit 140, a rotation driving unit 150, a first pressure sensor 160A, a second pressure sensor 160B, and a controller 170. The ground treating unit 120 is mounted at the frame 110 and is configured to treat the ground. One end of the connecting rod set 130 connects to the frame 110, and another end of the connecting rod set 130 connects to the mobile vehicle 50. The connecting rod driving unit 140 is mounted at the connecting rod set 130 and configured to adjust the orientation of the connecting rod set 130. Because of the cooperation of the connecting rod driving unit 140 and the connecting rod set 130, the frame 110 can be moved to a desired position. For example, during non-working period, the connecting rod driving unit 140 can drive the connecting rod set 130 to move the frame 110 to a resting position of the mobile vehicle 50. During working period, the connecting rod driving unit 140 can drive the connecting rod set 130 to move the frame 110 to a working position. The rotation driving unit 150 is mounted between the frame 110 and the connecting rod set 130 and configured to drive the frame 110 to rotate relative to the connecting rod set 130. The first pressure sensor 160A and the second pressure sensor 160B are mounted at the frame 110 to sense the first pressure value and the second pressure value between the frame 110 and the ground. The controller 170 is configured to control the connecting rod driving unit 140 and the rotation driving unit 150 to change the first pressure value and the second pressure value.

Figure 2:
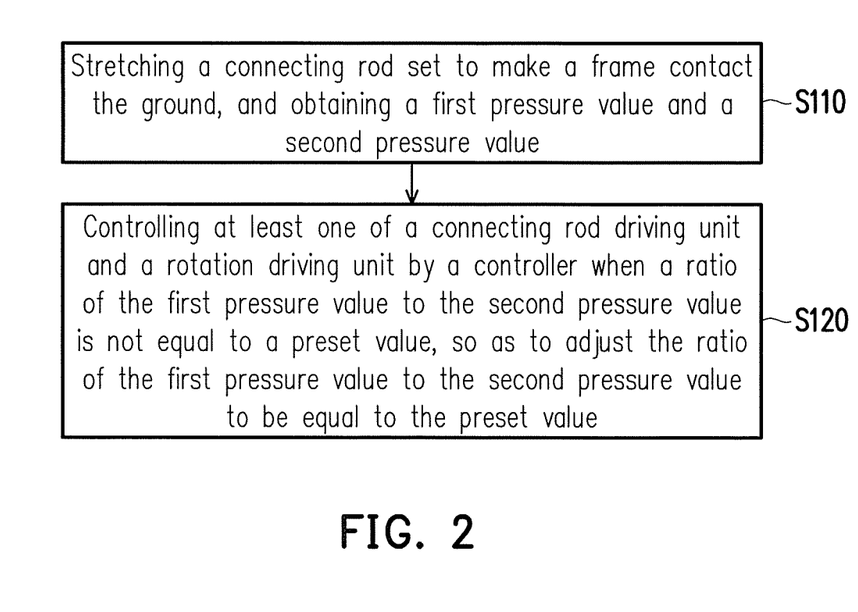
FIG. 2 illustrates an orientation adjusting method of a ground treating equipment according to an embodiment of the disclosure.

FIG. 2 illustrates an orientation adjusting method of a ground treating equipment according to an embodiment of the disclosure. Referring to FIGS. 1 and 2, in the orientation adjusting method of the ground treating equipment of the present embodiment, the connecting rod set 130 is stretched first to make the frame 110 contact the ground, so as to obtain the first pressure value and the second pressure value, step S110. In other words, when reaching the working area, the mobile vehicle 50 stretches the connecting rod set 130 to drive the frame 110 to contact the ground, at the same time, the first pressure sensor 160A and the second pressure sensor 160B sense and send back the first pressure value and the second pressure value. Next, a ratio of the first pressure value to the second pressure value is calculated. When the ratio is not equal to a preset value, the controller 170 further controls at least one of the connecting rod driving unit 140 and the rotation driving unit 150, so as to adjust the ratio of the first pressure value to the second pressure value to be equal to the preset value, as described in step S120. When the ratio of the first pressure value and the second pressure value is equal to the preset value, it represents that the frame 110 contacts with the ground at the desired orientation, such as being parallel to the ground, so that, at this time, the ground treating unit 120 can start to treat the ground.

Based on the above, since the first pressure sensor 160A and the second pressure sensor 160B can sense and send back the first pressure value and the second pressure value and the ratio of the first pressure value to the second pressure value is calculated to determine whether the ratio is equal to the preset value, it can be understood whether the frame 110 contacts the ground in the desired orientation. In addition, the controller 170 further controls at least one of the connecting rod driving unit 140 and the rotation driving unit 150 to adjust the orientation of the frame 110. Therefore, in the mobile vehicle, the ground treating equipment, and the orientation adjusting method of the present embodiment, it is not necessary to determine the orientation of the frame 110 basing on human eye, the accuracy of determining the orientation of the frame 110 can be improved, and the probability of damaging to the equipment is reduced.

In present embodiment, the first pressure sensor 160A and the second pressure sensor 160B are mounted at the frame 110 to sense the first pressure value and the second pressure value between the frame 110 and the ground, but the disclosure is not limited thereto. For example, the ground treating equipment 100 of the present embodiment further includes a third pressure sensor 160C and a fourth pressure sensor 160D mounted at the rotation driving unit 150 to sense the third pressure value and the fourth pressure value while the frame 110 is driven to rotate clockwise and counter-clockwise. The ratio of the third pressure value to the fourth pressure value is calculated to determine whether the ratio is equal to the preset value, so it is possible to determine whether the frame 110 is contact with the ground at desired orientation. The first pressure sensor 160A, the second pressure sensor 160B, the third pressure sensor 160C, and the fourth pressure sensor 160D are all mounted in the present embodiment as an example. In another embodiment, only the first pressure sensor 160A and the second pressure sensor 160B are mounted. In yet other embodiment, only the third pressure sensor 160C and the fourth pressure sensor 160D are mounted. Otherwise, the preset value of the ratio of the first pressure value to the second pressure value and the preset value of the ratio of the third pressure value to the fourth pressure value may be or may be not equal to each other. In general, the above-mentioned preset value may be equal to 1 or may be equal to other values adopted because of the mounting position of the sensor or because of other different factors. When the preset value is equal to 1, the target of the controller 170 is to control the first pressure value and the second pressure value to be equal to each other.

Otherwise, the connecting rod driving unit 140 includes a plurality of hydraulic rods 142, 144, and 146 in the present embodiment as an example. In other words, based on hydraulic working principle, the connecting rod driving unit 140 can drive the connecting rod set 130 to stretch, to retract, or to perform other actions. Compared to other mechanical driving elements, the hydraulic rods 142, 144, and 146 can endure in a harsh environment better and can help to reduce cost of repairing and replacement. On the other hand, the connecting rod set 130 includes a plurality of connecting rod 132, 134, and 136 in the present embodiment as an example. Two ends of the hydraulic rod 142 respectively connect to the connecting rods 132 and 134 near the frame 110, two ends of the hydraulic rod 144 respectively connect the connecting rods 134 and 136 nearby each other, and two ends of the hydraulic rod 146 respectively connect the connecting rod 136 near the mobile vehicle 50 and the body of the mobile vehicle 50. Although the three hydraulic rods 142, 144, and 146 are arranged in groups with the three connecting rods 132, 134, and 136 in the present embodiment, but the disclosure is not limited thereto.

Optionally, the ground treating equipment 100 of the present embodiment may further have a fifth pressure sensor 160E and a sixth pressure sensor 160F, and the fifth pressure sensor 160E and the sixth pressure sensor 160F are mounted at the hydraulic rod 142 to sense the fifth pressure value and the sixth pressure value while the hydraulic rod 142 is stretched and retracted. A ratio of the fifth pressure value to the sixth pressure value is calculated to determine whether the ratio is equal to the preset value, so it is possible to determine whether the frame 110 is contact with the ground at desired orientation. The preset value of the ratio of the first pressure value to the second pressure value and the preset value of the ratio of the fifth pressure value to the sixth pressure value may be or may be not equal to each other.

In other words, the first pressure sensor 160A, the second pressure sensor 160B, the third pressure sensor 160C, the fourth pressure sensor 160D, the fifth pressure sensor 160E and the sixth pressure sensor 160F are all mounted in the present embodiment as an example. In another embodiment, only the first pressure sensor 160A, the second pressure sensor 160B, the fifth pressure sensor 160E and the sixth pressure sensor 160F are mounted. In yet other embodiment, only the third pressure sensor 160C, the fourth pressure sensor 160D, the fifth pressure sensor 160E and the sixth pressure sensor 160F are mounted.

Figure 3:
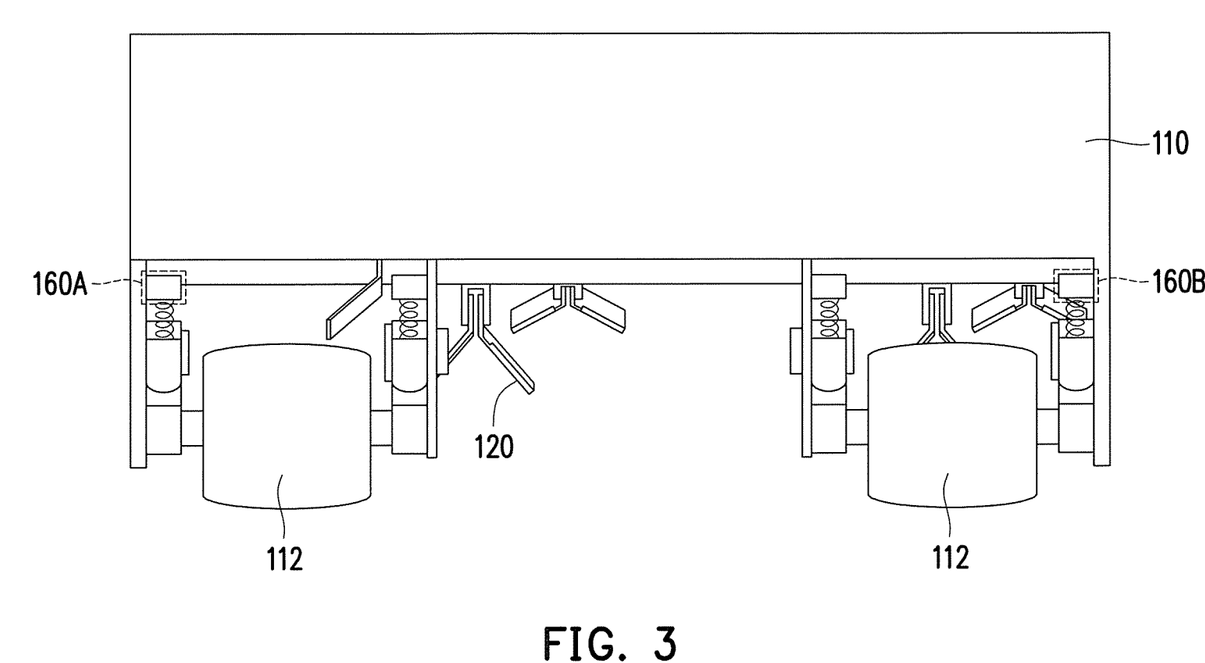
FIG. 3 is a partial schematic view of the ground treating equipment in FIG. 1.

FIG. 3 is a partial schematic view of the ground treating equipment in FIG. 1. Referring to FIG. 3, the frame 110 of the present embodiment has two wheels 112. The two wheels 112 may be idle pulleys, it means that the two wheels 112 do not connect to any driving device and can only rotate with the relative movement between the frame 110 and the object (such as the ground) that the wheel 112 in contact with. Since the frame 110 is in contact with the ground through the wheels 112, the first pressure sensor 160A and the second pressure sensor 160B may be respectively mounted at the two wheels 112, so as to determine the orientation of the frame 110 with respect to the ground. For example, the first pressure sensor 160A and the second pressure sensor 160B may be respectively mounted at the shock absorber of the two wheels 112. In another embodiment, if the frame 110 is not necessary to be in contact with the ground through the wheels 112, the first pressure sensor 160A and the second pressure sensor 160B may be respectively mounted at the portions configured to contact the ground of the frame 110, so as to determine the orientation of the frame 110 with respect to the ground.

Referring to FIG. 1, the ground treating unit 120 of the present embodiment is configured to mow, so as to be depicted as blades. However, the ground treating unit 120 of the present embodiment of the disclosure may also be configured to sweep the ground or perform other ground treatment. Otherwise, the connecting rod set 130 of the present embodiment may also translate with respect to the body of the mobile vehicle 50 along the Y axis through a translating mechanism 180, for example.

The rotation driving unit 150 of the present embodiment may be a hydraulic rotation driving unit. The hydraulic rotation driving unit 150 drives the frame 110 to rotate clockwise or counter-clockwise by adjusting the amount of the fluid inputted through different ports. Therefore, the third pressure sensor 160C and the fourth pressure sensor 160D may be mounted at the different ports of the hydraulic rotation driving unit 150, so as to measure the pressure of the fluid which is inputted or output. Similarly, the hydraulic rod 142 is stretched or retracted by adjusting the amount of the fluid inputted through the different ports, so the fifth pressure sensor 160E and the sixth pressure sensor 160F may be mounted at the different ports of the hydraulic rod 142 in order to measure the pressure of the fluid which is inputted or output. In the present embodiment, the first pressure sensor 160A, the second pressure sensor 160B, the third pressure sensor 160C, the fourth pressure sensor 160D, the fifth pressure sensor 160E and the sixth pressure sensor 160F may be microelectromechanical (MEMS) sensor or other types of sensor, and the specific mounting positions of the first to sixth sensors 160A to 160F may be adjusted according to situation, so the first to sixth sensors 160A to 160F are depicted with dotted line in FIGS. 1 and 2.

Figure 4:
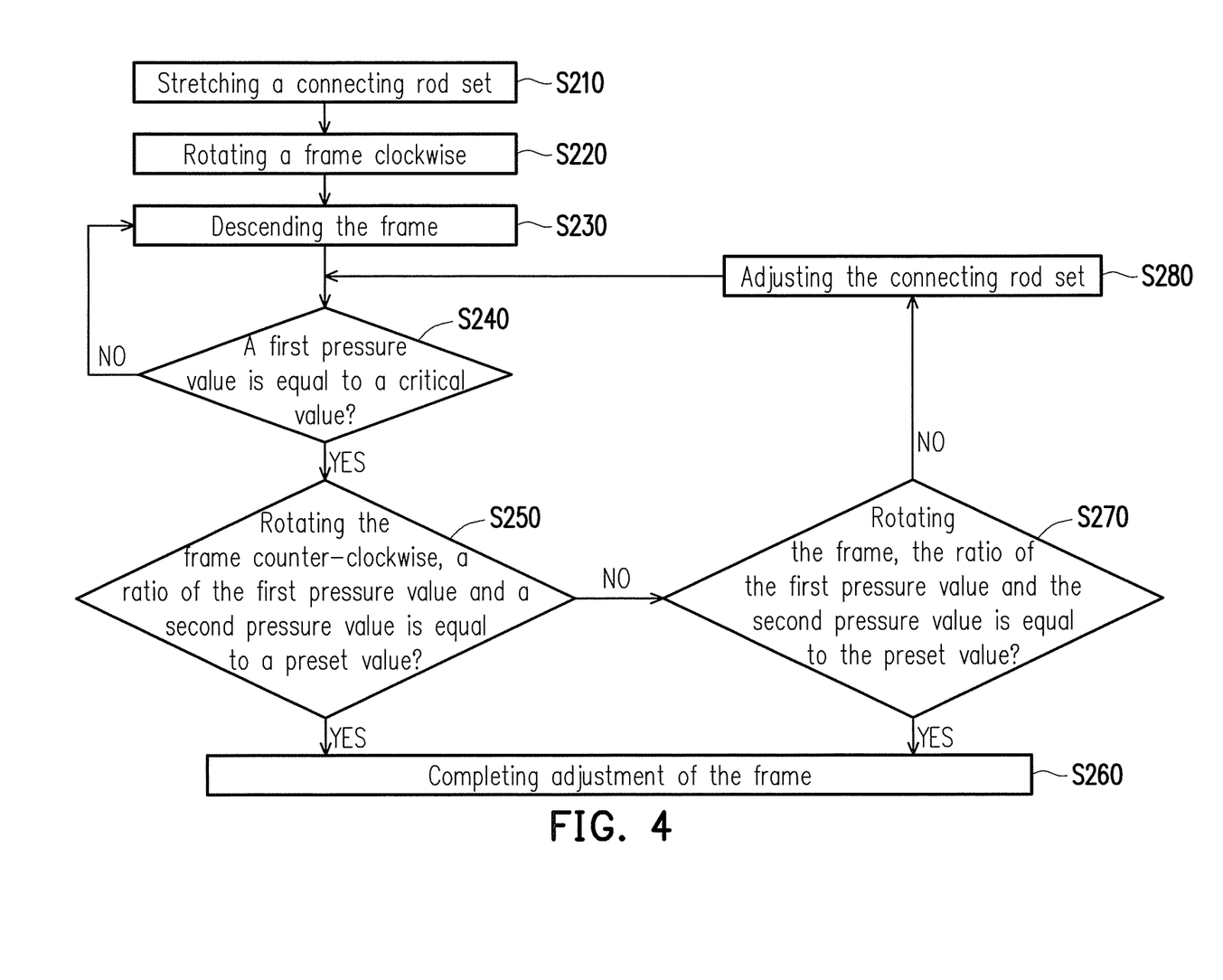
FIG. 4 illustrates an orientation adjusting method of a ground treating equipment according to another embodiment of the disclosure.

FIG. 4 illustrates an orientation adjusting method of a ground treating equipment according to another embodiment of the disclosure. An orientation adjusting method of a ground treating equipment in the present embodiment is basically similar to the orientation adjusting method of the ground treating equipment in FIG. 2, but the present embodiment provides more specific and detail steps, the disclosure is not limited thereto. Referring to FIGS. 1 and 4, the connecting rod set 130 is stretched first in step S210. This time, the frame 110 may be not in contact with the ground. Next, the rotation driving unit 150 drives the frame 110 to rotate with respect to the connecting rod set 130 a preset angle, such as positive 15°, in step S220. The positive angle is defined as the angle that the frame 110 rotates clockwise around the X axis. Next, the connecting rod driving unit 140 drives the connecting rod set 130 to descend the frame 110, such as descending the frame 110 along the Z axis, in step S230. In the process of descending the frame 110, it can be determined whether the first pressure value sensed by the first pressure sensor 160A gradually increases to be equal to a critical value, in step S240. When the first pressure value is not equal to the critical value, it can be determined that the frame 110 is still not in contact with the ground, so the step S230 continue to be executed. When the first pressure value is equal to the critical value, it can be determined that the frame 110 is in contact with the ground, and the rotation driving unit 150 drives the frame 110 to rotate counter-clockwise with respect to the connecting rod set 130, such as rotating counter-clockwise an angle of 15°, in step S250.

This time, the ratio of the first pressure value to the second pressure value is calculated. When the ratio of the first pressure value and the second pressure value is equal to the preset value, it represents that the orientation of the frame 110 is completely adjusted and the frame 110 contacts with the ground at the desired orientation, such as being parallel to the ground, so that, at this time, the ground treating unit 120 can start to treat the ground, as described in step S260. If the ratio of the first pressure value and the second pressure value is not equal to the preset value, the controller 170 will further controls the connecting rod driving unit 150 to drive the frame 110 to rotate, so as to adjust the ratio of the first pressure value to the second pressure value to be equal to the preset value, as described in step S270. When the ratio of the first pressure value and the second pressure value is equal to the preset value, it represents that the orientation of the frame 110 is completely adjusted so that, at this time, the ground treating unit 120 can start to treat the ground, as described in step S260. If the ratio of the first pressure value and the second pressure value is not equal to the preset value, the controller 170 will further control the connecting rod driving unit 140 to adjust the connecting rod set 130, as described in step S280, and the process will return to step S240 to continue the determination. In the process above, the orientation adjusting method of the ground treating equipment in the present embodiment can achieve the effect that the orientation of the frame 110 is adjusted to be an ideal orientation.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A ground treating equipment, configured to connect to a mobile vehicle and comprising:
   a frame;
   a ground treating unit, mounted at the frame;
   a connecting rod set, wherein one end of the connecting rod set is connected to the frame, and another end of the connecting rod set is connected to the mobile vehicle;
   a connecting rod driving unit, mounted at the connecting rod set and configured to adjust orientation of the connecting rod set;
   a rotation driving unit, mounted between the frame and the connecting rod set and configured to drive the frame to rotate relative to the connecting rod set;
   a first pressure sensor and a second pressure sensor, mounted at the frame and sensing a first pressure value and a second pressure value between the frame and ground, or mounted at the rotation driving unit and sensing a first pressure value and a second pressure value while the frame is driven to rotate clockwise and counter-clockwise; and
   a controller, configured to control the connecting rod driving unit and the rotation driving unit to change the first pressure value and the second pressure value.

2. The ground treating equipment as recited in claim 1, further comprising a third pressure sensor and a fourth pressure sensor, wherein the first pressure sensor and the second pressure sensor are mounted at the frame, and the third pressure sensor and the fourth pressure sensor are mounted at the rotation driving unit to sense a third pressure value and a fourth pressure value while the frame is driven to rotate clockwise and counter-clockwise.

3. The ground treating equipment as recited in claim 1, wherein the frame has two wheels, the first pressure sensor and the second pressure sensor are respectively mounted at the two wheels.

4. The ground treating equipment as recited in claim 1, wherein the rotation driving unit is a hydraulic rotation driving unit.

5. The ground treating equipment as recited in claim 1, wherein the connecting rod driving unit comprises a plurality of hydraulic rods.

6. The ground treating equipment as recited in claim 5, further comprising a third pressure sensor and a fourth pressure sensor, wherein the connecting rod set comprises a plurality of connecting rods, two ends of a first hydraulic rod in the plurality of hydraulic rods are respectively connected to two connecting rods near the frame of the plurality of connecting rods, the third pressure sensor and the fourth pressure sensor are mounted at the first hydraulic rod to sense a third pressure value and a fourth pressure value while the first hydraulic rod is stretched or retracted, and wherein the first pressure sensor and the second pressure sensor are amounted at the frame.

7. The ground treating equipment as recited in claim 5, further comprising a third pressure sensor and a fourth pressure sensor, wherein the connecting rod set comprises a plurality of connecting rods, two ends of a first hydraulic rod in the plurality of hydraulic rods are respectively connected to two connecting rods near the frame of the plurality of connecting rods, the third pressure sensor and the fourth pressure sensor are mounted at the first hydraulic rod to sense a third pressure value and a fourth pressure value while the first hydraulic rod is stretched or retracted, and wherein the first pressure sensor and the second pressure sensor are amounted at the rotation driving unit.

8. A mobile vehicle having a ground treating equipment, and the ground treating equipment comprising:
   a frame;
   a ground treating unit, mounted at the frame;
   a connecting rod set, wherein one end of the connecting rod set is connected to the frame, and another end of the connecting rod set is connected to the mobile vehicle;
   a connecting rod driving unit, mounted at the connecting rod set and configured to adjust orientation of the connecting rod set;
   a rotation driving unit, mounted between the frame and the connecting rod set and configured to drive the frame to rotate relative to the connecting rod set;
   a first pressure sensor and a second pressure sensor, mounted at the frame and sensing a first pressure value and a second pressure value between the frame and ground, or mounted at the rotation driving unit and sensing a first pressure value and a second pressure value while the frame is driven to rotate clockwise and counter-clockwise; and
   a controller, configured to control the connecting rod driving unit and the rotation driving unit to change the first pressure value and the second pressure value.

9. The mobile vehicle as recited in claim 8, wherein the ground treating equipment further comprises a third pressure sensor and a fourth pressure sensor, wherein the first pressure sensor and the second pressure sensor are mounted at the frame, and the third pressure sensor and the fourth pressure sensor are mounted at the rotation driving unit to sense a third pressure value and a fourth pressure value while the frame is driven to rotate clockwise and counter-clockwise.

10. The mobile vehicle as recited in claim 8, wherein the frame has two wheels, the first pressure sensor and the second pressure sensor are respectively mounted at the two wheels.

11. The mobile vehicle as recited in claim 8, wherein the rotation driving unit is a hydraulic rotation driving unit.

12. The mobile vehicle as recited in claim 8, wherein the connecting rod driving unit comprises a plurality of hydraulic rods.

13. The mobile vehicle as recited in claim 12, wherein the ground treating equipment further comprises a third pressure sensor and a fourth pressure sensor, wherein the connecting rod set comprises a plurality of connecting rods, two ends of a first hydraulic rod in the plurality of hydraulic rods are respectively connected to two connecting rods near the frame of the plurality of connecting rods, the third pressure sensor and the fourth pressure sensor are mounted at the first hydraulic rod to sense a third pressure value and a fourth pressure value while the first hydraulic rod is stretched or retracted, and wherein the first pressure sensor and the second pressure sensor are amounted at the frame.

14. The mobile vehicle as recited in claim 12, wherein the ground treating equipment further comprises a third pressure sensor and a fourth pressure sensor, wherein the connecting rod set comprises a plurality of connecting rods, two ends of a first hydraulic rod in the plurality of hydraulic rods respectively connect to two connecting rods near the frame of the plurality of connecting rods, the third pressure sensor and the fourth pressure sensor are mounted at the first hydraulic rod to sense a third pressure value and a fourth pressure value while the first hydraulic rod is stretched or retracted, and wherein the first pressure sensor and the second pressure sensor are amounted at the rotation driving unit.

15. An orientation adjusting method of a ground treating equipment, configured to adjust orientation of the ground treating equipment recited in claim 1 and comprising:
    stretching the connecting rod set to drive the frame to contact with ground, and obtaining the first pressure value and the second pressure value; and
    controlling at least one of the connecting rod driving unit and the rotation driving unit by the controller when a ratio of the first pressure value to the second pressure value is smaller than or greater than a preset value, so as to adjust the ratio of the first pressure value to the second pressure value to be equal to the preset value.

16. The orientation adjusting method of the ground treating equipment as recited in claim 15, further comprising: driving the frame to rotate relative to the connecting rod set a preset angle after stretching the connecting rod set and before the frame is in contact with ground.

\* \* \* \* \*